(12) United States Patent  
Kim et al.

(10) Patent No.: US 9,221,349 B2
(45) Date of Patent: Dec. 29, 2015

(54) CHARGING SYSTEM FOR VEHICLE AND VEHICLE COMPRISING THE SAME

(71) Applicant: LG CHEM, LTD., Seoul (KR)

(72) Inventors: Sung-Jong Kim, Daejeon (KR); Soon-Ho Ahn, Daejeon (KR); Joong-Jae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/523,029

(22) Filed: Oct. 24, 2014

(65) Prior Publication Data

US 2015/0046013 A1 Feb. 12, 2015

Related U.S. Application Data

(63) Continuation of application No. PCT/KR2014/004112, filed on May 8, 2014.

(30) Foreign Application Priority Data

May 8, 2013 (KR) .......... 10-2013-0052089
May 8, 2014 (KR) .......... 10-2014-0055108

(51) Int. Cl.
| G06F 7/00 | (2006.01) |
| G06F 17/00 | (2006.01) |
| G05D 1/00 | (2006.01) |
| G05D 3/00 | (2006.01) |
| B60L 9/00 | (2006.01) |
| B60L 11/00 | (2006.01) |

(Continued)

(52) U.S. Cl.
CPC ........... B60L 11/1809 (2013.01); B60R 16/033 (2013.01); H02J 7/1446 (2013.01)

(58) Field of Classification Search
USPC ............. 701/22, 36; 307/10.7, 10.6, 10.1, 18, 307/19, 25, 28; 320/150, 161, 119, 166, 320/135; 702/63; 315/169.3; 180/65.1, 180/65.21, 65.31; 123/179.3, 179.1
See application file for complete search history.

(56) References Cited

U.S. PATENT DOCUMENTS

2001/0052758 A1 12/2001 Odaohhara
2002/0078914 A1* 6/2002 Manabe et al. ............ 123/179.3
(Continued)

FOREIGN PATENT DOCUMENTS

| JP | 10-208747 A | 8/1998 |
| JP | 2002-195138 A | 7/2002 |

(Continued)

OTHER PUBLICATIONS

International Search Report issued in PCT/KR2014/004112, dated Sep. 4, 2014.

(Continued)

*Primary Examiner* — Ronnie Mancho
(74) *Attorney, Agent, or Firm* — Birch, Stewart, Kolasch & Birch, LLP

(57) ABSTRACT

A power source for vehicles according to the present disclosure includes a secondary battery pack to support power required to start up a vehicle and power required for an electronic device equipped in the vehicle together, and having an operating voltage range of 9V to 19V in which a maximum operating voltage ranges from 16V to 19V and an average voltage is higher than or equal to 12V, and an alternator to produce a charging power for the secondary battery pack in response to operation of an engine of the vehicle.

16 Claims, 4 Drawing Sheets

(51) Int. Cl.
*B60L 11/18* (2006.01)
*B60R 16/033* (2006.01)
*H02J 7/14* (2006.01)

(56) References Cited

U.S. PATENT DOCUMENTS

| | | | |
|---|---|---|---|
| 2007/0001616 A1* | 1/2007 | Puccetti et al. | 315/169.3 |
| 2007/0247115 A1* | 10/2007 | Ishikawa et al. | 320/119 |
| 2009/0088994 A1* | 4/2009 | Machiyama et al. | 702/63 |
| 2009/0258282 A1* | 10/2009 | Harada et al. | 429/61 |
| 2010/0090527 A1* | 4/2010 | Tarnowsky et al. | 307/10.7 |
| 2010/0106351 A1* | 4/2010 | Hanssen et al. | 701/22 |
| 2010/0121511 A1* | 5/2010 | Onnerud et al. | 701/22 |
| 2011/0046832 A1* | 2/2011 | Francoeur | 701/22 |
| 2011/0276295 A1* | 11/2011 | Gaben et al. | 702/85 |
| 2012/0136534 A1* | 5/2012 | Walsh et al. | 701/36 |
| 2012/0136557 A1 | 5/2012 | Yu et al. | |
| 2014/0095018 A1* | 4/2014 | Atluri et al. | 701/36 |
| 2015/0028808 A1* | 1/2015 | Bernardi et al. | 320/109 |
| 2015/0046013 A1* | 2/2015 | Kim et al. | 701/22 |

FOREIGN PATENT DOCUMENTS

| | | |
|---|---|---|
| KR | 10-2005-0041110 A | 5/2005 |
| KR | 20-2008-0005929 U | 12/2008 |
| KR | 10-2012-0059237 A | 6/2012 |

OTHER PUBLICATIONS

Written Opinion of the International Searching Authority issued in PCT/KR2014/004112, dated Sep. 4, 2014.

* cited by examiner

CHARGING SYSTEM FOR VEHICLE AND VEHICLE COMPRISING THE SAME

CROSS-REFERENCE TO RELATED APPLICATION

The present application is a continuation of International Application No. PCT/KR2014/004112 filed on May 8, 2014, which claims priority to Korean Patent Application No. 10-2013-0052089 filed in the Republic of Korea on May 8, 2013 and Korean Patent Application No. 10-2014-0055108 filed in the Republic of Korea on May 8, 2014, the disclosures of which are incorporated herein by reference.

TECHNICAL FIELD

The present disclosure relates to a charging system for vehicles and a vehicle comprising the same, and more particularly, to a charging system for vehicles that may ensure excellent startability of a vehicle and provide a stable power supply to an electronic device equipped in the vehicle, and a vehicle comprising the same.

BACKGROUND ART

Recently, improvement of energy efficiency and $CO_2$ emissions reduction is a target imposed on the automobile industries, and automobile manufacturers are making continuous attempts to improve energy efficiency by reducing an engine load in the support of enhanced storage batteries.

Also, to successfully settle an idle stop and go system (ISG) system and a micro hybrid system being actively developed in recent days, development of high performance storage batteries is urgently required.

The movement toward high performance of storage batteries for automobile applications exercises much influences on development of car performance directly and indirectly, and due to their limitations in performance, conventional lead storage batteries have many limits of their ability to supply power necessary for smooth start-up of a vehicle or to provide a stable output supply to many electronic devices mounted in the vehicle.

Accordingly, there is an urgent need to introduce a charging system that may sufficiently solve the above problems while minimizing changes of other automotive components.

DISCLOSURE

Technical Problem

The present disclosure is designed to solve the above problem, and therefore the present disclosure is directed to providing a charging system for vehicles that may ensure excellent startability of vehicles while not causing a great change in an entire existing construction of components in vehicles and may achieve improved charging efficiency, as well as provide a more stable power supply to an electronic device equipped in vehicles.

Rather, the object of the present disclosure is not limited to the above, and the other objects will be better understood by those having ordinary skill in the art from the following detailed description.

Technical Solution

To achieve the above object, a power source for vehicles according to the present disclosure includes a secondary battery pack to support power required to start up a vehicle and power required for an electronic device equipped in the vehicle together, and having an operating voltage range of 9V to 19V in which a maximum operating voltage ranges from 16V to 19V and an average voltage is higher than or equal to 12V, and an alternator to produce a charging power for the secondary battery pack in response to operation of an engine of the vehicle.

The average voltage of the battery pack may have a higher value than a nominal voltage of the electronic device equipped in the vehicle.

The lithium secondary battery may include a cathode having a cathode active material comprising at least one selected form the group consisting of NMC-based, LCO-based, LMO-based, and NCA-based active materials, and an anode having an anode active material comprising at least one selected from the group consisting of graphite, LTO, soft carbon, and hard carbon.

The alternator may apply a charging voltage between both ends of the secondary battery pack, and a higher voltage than the voltage of the secondary battery pack may be applied.

The alternator may produce a charging current in a range of 0 A to 300 A and provide it to the secondary battery pack.

An output voltage of the secondary battery pack at a certain state of charge (SOC) may be higher than an output voltage of a 12V lead storage battery pack at the same SOC.

An output voltage difference between the secondary battery pack and the 12V lead storage battery pack at the same SOC may be less than and equal to 4.4V.

The power source for vehicles may include an idle stop and go (ISG) cancellation unit to cancel an ISG mode of the vehicle when the voltage of the secondary battery pack drops down to a reference voltage value.

Meanwhile, the above object may be also achieved by a vehicle according to an exemplary embodiment of the present disclosure, the vehicle according to an exemplary embodiment of the present disclosure includes a secondary battery pack to support power required to start up a vehicle and power required for an electronic device equipped in the vehicle together, and having an operating voltage range of 9V to 19V in which a maximum operating voltage ranges from 16V to 19V and an average voltage is higher than or equal to 12V, and an alternator to produce a charging power for the secondary battery pack in response to operation of an engine of the vehicle.

The average voltage of the battery pack may have a higher value than a nominal voltage of the electronic device equipped in the vehicle.

The lithium secondary battery may include a cathode having a cathode active material comprising at least one selected form the group consisting of NMC-based, LCO-based, LMO-based, and NCA-based active materials, and an anode having an anode active material comprising at least one selected from the group consisting of graphite, LTO, soft carbon, and hard carbon.

The alternator may apply a charging voltage between both ends of the secondary battery pack, and a higher voltage than the voltage of the secondary battery pack may be applied.

The alternator may produce a charging current in a range of 0 A to 300 A and provide it to the secondary battery pack.

An output voltage of the secondary battery pack at a certain SOC may be higher than an output voltage of a 12V lead storage battery pack at the same SOC.

An output voltage difference between the secondary battery pack and the 12V lead storage battery pack at the same SOC may be less than and equal to 4.4V.

The vehicle may include an ISG cancellation unit to cancel an ISG mode of the vehicle when the voltage of the secondary battery pack drops down to a reference voltage value.

Advantageous Effects

According to one aspect, even if an output voltage of a battery increases, the voltage does not depart from an operating voltage range of an electronic device mounted in a vehicle, so there is no need to change an entire existing construction of a charging system for vehicles.

According to another aspect, through a higher voltage than a conventional charging system, excellent startability of vehicles may be guaranteed, in particular, steady startability for vehicles required to stop and gostart frequently, such as vehicles to which an idle stop and go (ISG) system is applied.

According to still another aspect, due to a higher voltage band than a conventional charging system, a charging voltage supplied from an alternator of a vehicle and regenerative braking energy may be accepted more efficiently, thereby achieving more efficient charging.

However, effects that may be obtained though the construction of the present disclosure are not limited to the above effects, and other effects not described herein will be apparently understood from the disclosure to be described below.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A charging system or a power source 10 for vehicles according to an exemplary embodiment will be described with reference to FIGS. 1 through 3.

Figure 1:
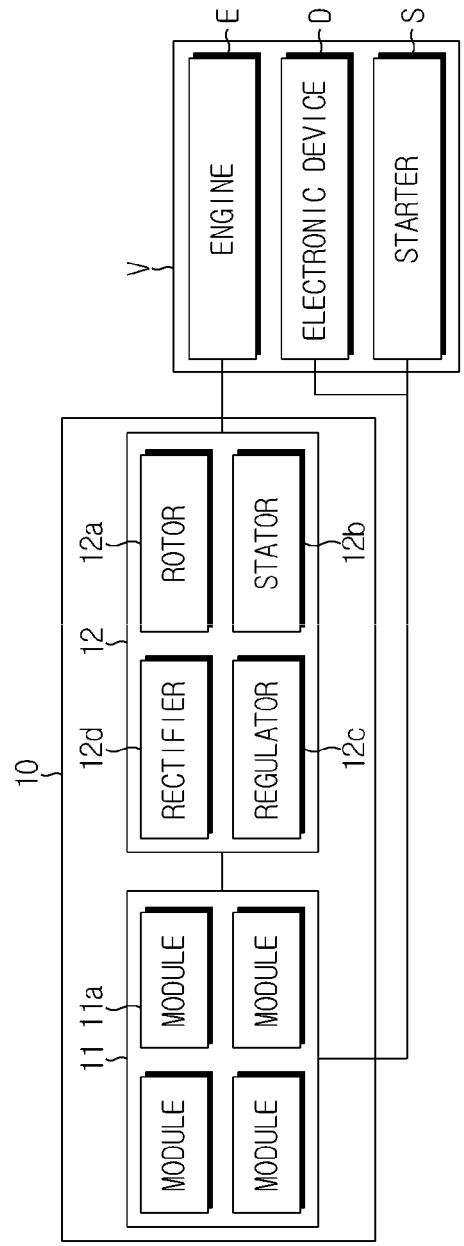
FIG. 1 is a block diagram illustrating a charging system for vehicles according to an exemplary embodiment.
Figure 2:
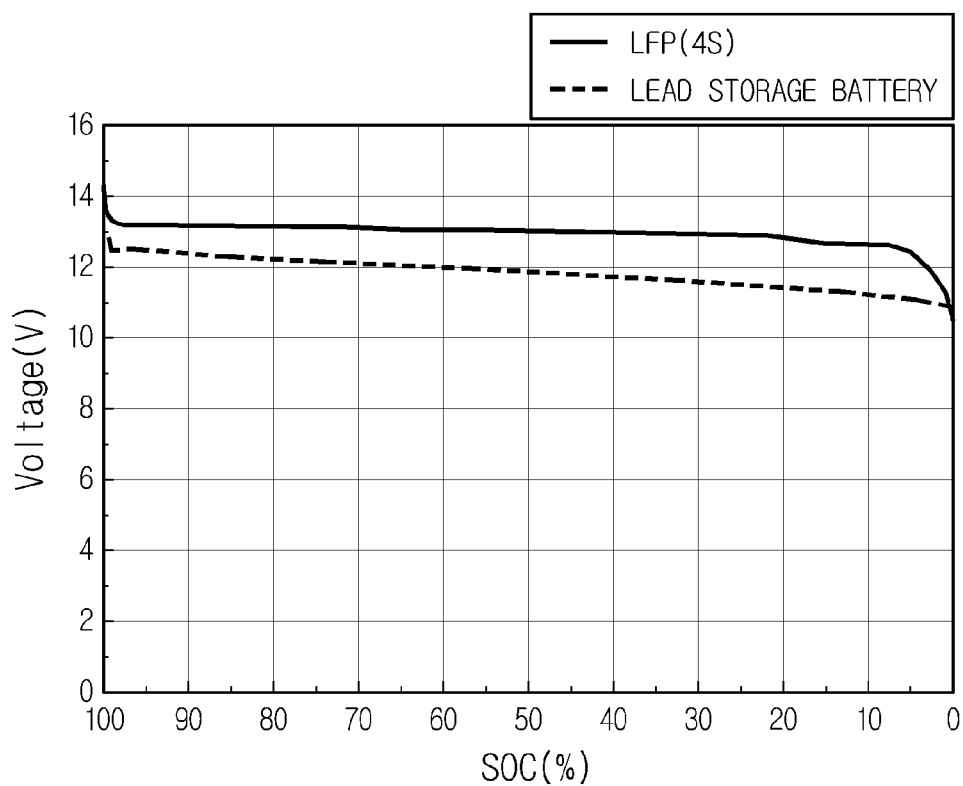
FIG. 2 is a graph illustrating a comparison of voltage profiles of a secondary battery pack employing LFP as a cathode active material and a 12V lead storage battery pack.
Figure 3:
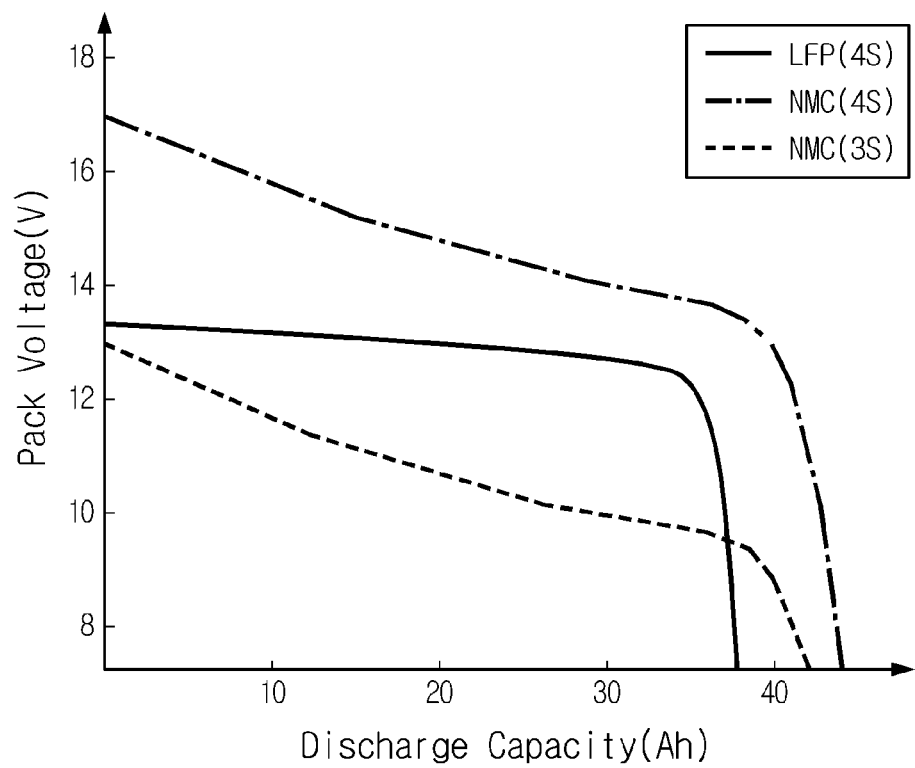
FIG. 3 is a graph illustrating a comparison of voltage profile of secondary battery packs employing NMC and LFP as a cathode active material, respectively.

FIG. 1 is a block diagram illustrating a charging system for vehicles according to an exemplary embodiment, FIG. 2 is a graph illustrating a comparison of voltage profiles of a secondary battery pack employing LFP as a cathode active material and a 12V lead storage battery pack, and FIG. 3 is a graph illustrating a comparison of voltage profile of secondary battery packs employing NMC and LFP as a cathode active material, respectively.

First, referring to FIG. 1, the charging system 10 for vehicles according to an exemplary embodiment includes a secondary battery pack 11 to supply power required to drive an electronic device D equipped in a vehicle V and a starter S for start-up of the vehicle V, and an alternator 12 to charge the secondary battery pack 11 with power generated using a rotational force of an engine E equipped in the vehicle V.

The secondary battery pack 11 may have a type of a series connection of a plurality of lithium secondary batteries, or a type of a series connection of a plurality of secondary battery modules 11a implemented by connecting a plurality of lithium secondary batteries in parallel.

A number of lithium secondary batteries constituting the secondary battery pack 11 is determined, taking a capacity and a voltage required for the secondary battery pack 11 into account, and for example, the secondary battery pack 11 may be formed by connecting in series four secondary battery modules 11a having a type of a parallel connection of thirty lithium secondary batteries. It is obvious that an overall capacity of the secondary battery pack 11 may change by decreasing or increasing a number of the lithium secondary batteries connected in parallel, or an output voltage of the secondary battery pack 11 may change by decreasing or increasing a number of the secondary battery modules 11a connected in series.

An operating voltage range of the secondary battery pack 11 is in a range of about 9.0V to 19.0V, and a maximum value of an operating voltage is in a range of about 16.0V to 19.0V. Here, the operating voltage range of the secondary battery pack 11 represents a voltage range that allows for start-up of the vehicle and operation of electrical/electronic components mounted in the vehicle within the range of voltages across both ends of the secondary battery pack 11 changing with a change in state of charge (SOC) of the secondary battery pack 11. Also, this operating voltage range of the secondary battery pack 11 is set in consideration of smooth start-up of the vehicle V and operating voltage ranges of various types of electronic devices D equipped in the vehicle V together.

Meanwhile, an average voltage of the secondary battery pack 11 may be higher than or equal to about 12V, preferably, higher than or equal to 13V, and here, the average voltage of the secondary battery pack 11 represents an arithmetic average of a maximum voltage value and a minimum voltage value of the secondary battery pack 11 based on the SOC.

For smooth start-up of the vehicle V, the secondary battery pack 11 is required to stably supply sufficient power to the starter S, and the voltage range of 9.0V to 19V corresponds to a range allowing for operation of the electronic device D equipped in the vehicle V while satisfying the demand for startability.

Particularly, because the average voltage of the secondary battery pack 11 is higher than or equal to a nominal voltage (12V) of an operating voltage according to the International standards (ISAD0103) for the electronic devices D applied in the vehicle, a stable power supply may be provided to the electronic device D mounted in the vehicle even in the case where the secondary battery pack 11 is applied to an idle stop and go (ISG) system that is required to start and go frequently.

Hereinafter, the secondary battery pack 11 having this operating voltage range is referred to as a 16V secondary battery pack 11.

The 16V secondary battery pack 11 may be formed by connecting in series lithium secondary batteries each having an operating voltage range in a range of about 2.25V to 4.75V, or by connecting in series a plurality of secondary battery modules 11a implemented by connecting a plurality of such lithium secondary batteries.

A type of an active material for the lithium secondary battery and a number of the lithium secondary batteries (or secondary battery modules) connected in series may be properly selected to meet the operating voltage range of the secondary battery pack 11.

Further, a cathode of the lithium secondary battery having the above operating voltage range may be a cathode employing, as a cathode active material, at least one selected from the group consisting of, for example, NMC ($Li(Ni_xCo_yMo_z)O_2$ (x>0, y>0, z>0, x+y+z=1)), LCO ($LiCoO_2$), and LMO ($LiMoO_2$).

However, the above active material group is for illustration only, an active material applied to the present disclosure is not limited thereto, and various active materials may be applied, for example, an NCA-based (lithium nickel cobalt aluminum-based) active material and the like.

A secondary battery employing this cathode active material has advantages of lower costs and higher output than a secondary battery employing an olivine (LFP; $LiFePO_4$)-based cathode active material.

Also, an anode of this lithium secondary battery may be an anode employing, as an anode active material, at least one selected from the group consisting of, for example, graphite, LTO ($Li_4Ti_5O_{12}$), and soft carbon.

Referring to FIGS. 2 and 3, the 16V secondary battery pack 11 employing NMC as a cathode active material shows a high output voltage for all operating voltage intervals, when compared to a secondary battery pack made up of lithium secondary batteries employing LFP as a cathode active material as well as a conventional 12V lead storage battery pack.

That is, an output voltage of the 16V secondary battery pack 11 at a certain SOC is higher all the time for the operating voltage interval (from about 10V to 17.4V) than an output voltage of a 12V lead storage battery pack at the same SOC (an output voltage difference is found to be greater than 0 and less than or equal to 4.4V), and this is the same as when compared to a secondary battery pack made up of lithium secondary batteries employing LFP as a cathode active material.

Here, the 12V lead storage battery pack represents a battery pack formed by connecting lead storage batteries having an operating voltage range of about 10.8V to 13.0V in series, or by connecting in series six lead storage battery modules implemented by connecting a plurality of such lead storage batteries in parallel, and this will be equally applied below.

Meanwhile, as described in the foregoing, the operating voltage range of the 16V secondary battery pack 11 has a higher average voltage range than a nominal voltage (12V) according to the International standards for various types of electronic devices D used in a vehicle to which a conventional 12V system is applied, and provides a higher voltage than voltage supplied from the 12V lead storage battery pack, allowing the electronic device D to operate more stably.

Besides, the 16V secondary battery pack 11 may be used at a lower voltage band than a lead storage battery pack. That is, when used below a lower limit of an operating voltage, that is, 10.8V, a lead storage battery pack cannot be recharged and loses a function as a secondary battery, whereas the 16V secondary battery pack 11 applied in the present disclosure can be used at about 9V even lower than 10.8V.

Now, the alternator 12 shown in FIG. 1 will be described. The alternator 12 includes a rotor 12a having an electromagnet, a stator 12b surrounding the rotor, a regulator 12c to maintain a generated voltage at a predetermined level, and a rectifier 12d to convert an alternating current having passed therethrough to a directing current.

As the alternator 12, an alternator generally used for vehicles may be applied. However, a battery pack applied to the charging system 10 for vehicles according to an exemplary embodiment is a 16V secondary battery pack 11 having a different usage voltage band from a conventional 12V lead storage battery pack, and accordingly, to charge the 16V secondary battery pack 11 favorably, a charging voltage of the alternator 12 also needs to be changed, and the charging voltage of the alternator 12 should be higher than an output voltage of the secondary battery pack 11 at the time of charging.

This charging voltage band may be changed by partially changing the design of a voltage regulation circuit (excitation circuit) the regulator 12c equipped in the alternator 12, and for instance, the charging voltage band may change through simple measures, for example, by changing a certain resistance value on the circuit, or changing a breakdown voltage value of a Zener diode installed on the circuit.

That is, the charging system 10 for vehicles according to an exemplary embodiment may use structures of other devices used under a conventional 12V system intactly without a great change, even though the 16V secondary battery pack 11 having a higher operating voltage band is applied.

Further, the alternator 12 may provide the secondary battery pack 11 with a charging current in a range of about 0 A to 300 A, preferably, in a range of about 80 A to 250 A. This charging current range provided from the alternator 12 has a much higher maximum value in comparison to a range of charging current values (around 80 A to 110 A) set suitably for a conventional 12V lead storage battery.

As the secondary battery pack 11 applied to the charging system 10 for vehicles according to the present disclosure employs a lithium secondary battery having a high operating voltage band, even though a charging current having this high value is provided, the secondary battery pack 11 may accept the charging current smoothly, thereby achieving efficient charging.

As described in the foregoing, the charging system 10 for vehicles according to an exemplary embodiment is provided with the secondary battery pack 11 having a higher maximum operating voltage range than a conventional system, and thus, even in a situation in which an output voltage is likely to reduce due to frequent start-up in a vehicle, particularly, to which an ISG system is applied, may ensure relatively steady startability.

Also, the charging system 10 for vehicles according to an exemplary embodiment has a higher maximum operating voltage range than a conventional charging system for vehicles, thereby providing a more stable power supply to the electronic devices D equipped in the vehicle.

Besides, the secondary battery pack 11 applied to the charging system 10 for vehicles may efficiently accept power supplied from the alternator 12 by employing a lithium secondary battery instead of a lead storage battery. Particularly, when the vehicle V is equipped with a charging system using regenerative braking energy, the secondary battery pack 11 may efficiently accept the regenerative braking energy and consequently, provide a more stable power supply.

Also, the secondary battery pack 11 applied to the charging system 10 for vehicles has a lower minimum operating voltage than a lead storage battery pack, and thus may provide a more stable power supply when a usage amount of electric current increases drastically (for example, restart in the application of an ISG system).

Figure 4:
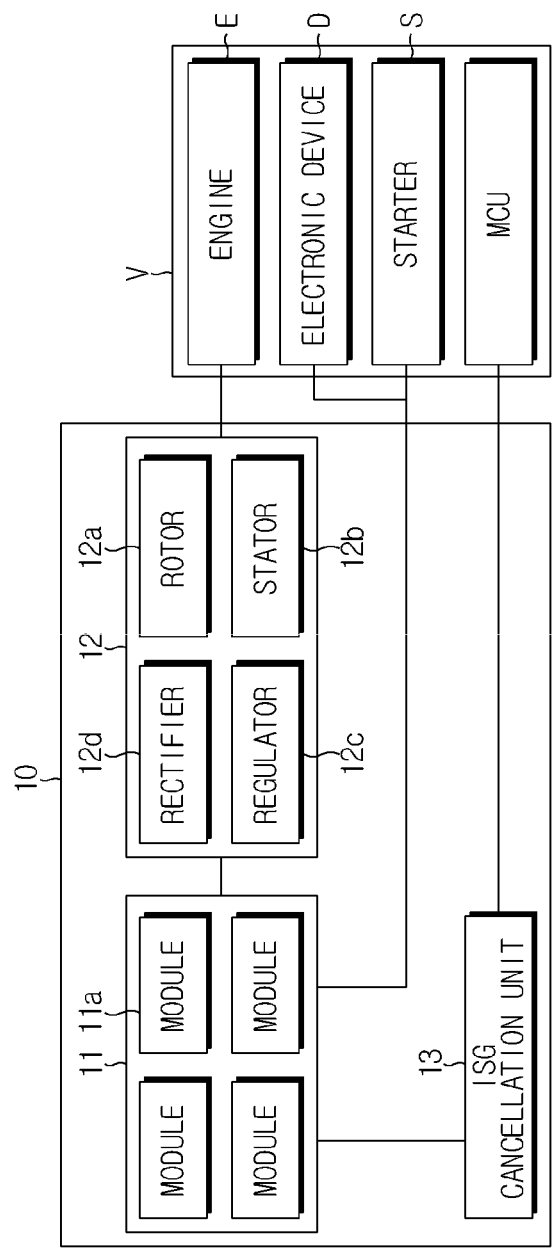
FIG. 4 is a block diagram illustrating a charging system for vehicles according to another exemplary embodiment.

Meanwhile, referring to FIG. 4, the charging system 10 for vehicles according to an exemplary embodiment may further include an ISG cancellation unit 13, and in the case where the charging system 10 for vehicles is used in a vehicle to which an ISG system requiring frequency restart is applied, the ISG cancellation unit 13 may prevent a reset phenomenon from occurring to all the electronic devices mounted in the vehicle by a drop in voltage of the secondary battery pack 11 less than a predetermined level due to a drastic voltage reduction following restart.

In this case, to prevent the electronic devices D mounted in the vehicle from being reset when a voltage drop occurs in the secondary battery pack 11 due to a drastic increase in electric current caused by restart of the vehicle to which the ISG system is applied, the ISG cancellation unit 13 cancels an ISG mode to preclude an engine from shutting off even if the vehicle stops, when the voltage of the secondary battery pack 11 drops down to a predetermined level.

The ISG cancellation unit 13 may be operable, for example, to output an ISG mode cancellation signal to a main control unit (MCU) of the vehicle by referring to the voltage (or SOC) of the secondary battery pack 11, and voltage measurement of the secondary battery pack 11 may be performed by a separate voltage measuring means or may be performed by the ISG cancellation unit 13 directly.

Here, the reference voltage (or SOC) for performing the ISG mode cancellation may be variously set based on a capacity of the vehicle, a type of the starter used, and the like.

As described in the foregoing, when the ISG mode is cancelled, the vehicle maintains a starting phase until a user shuts off the engine through key off, thereby escaping low voltage hazards through charging of the secondary battery pack 11 by operation of the alternator.

Meanwhile, in the description of the present disclosure, it should be understood that each element shown in FIG. 1 is distinguished logically rather than physically.

That is, since each element of the present disclosure corresponds to a logical component for realizing the spirit of the present disclosure, even though elements are integrated or divided, if functions are found to be identical or similar, the integrated or divided elements should be construed as falling within the scope of the present disclosure, regardless of the names they are called.

Hereinabove, the present disclosure has been described by specific embodiments and drawings, but the present disclosure is not limited thereto and it should be understood that various changes and modifications may be made by those having ordinary skill in the art within the spirit and scope of the disclosure and the appended claims and their equivalents.

What is claimed is:

1. A power source for vehicles, comprising:
 a secondary battery pack to support power required to start up a vehicle and power required for an electronic device equipped in the vehicle together, and having an operating voltage range of 9V to 19V in which a maximum operating voltage ranges from 16V to 19V and an average voltage is higher than or equal to 12V; and
 an alternator to produce a charging power for the secondary battery pack in response to operation of an engine of the vehicle.

2. The power source for vehicles according to claim 1, wherein the average voltage of the battery pack has a higher value than a nominal voltage of the electronic device equipped in the vehicle.

3. The power source for vehicles according to claim 1, wherein the alternator applies a charging voltage between both ends of the secondary battery pack, and a higher voltage than the voltage of the secondary battery pack is applied.

4. The power source for vehicles according to claim 1, wherein the alternator produces a charging current in a range of 0 A to 300 A and provides it to the secondary battery pack.

5. The power source for vehicles according to claim 1, wherein an output voltage of the secondary battery pack at a certain state of charge (SOC) is higher than an output voltage of a 12V lead storage battery pack at the same SOC.

6. The power source for vehicles according to claim 5, wherein an output voltage difference between the secondary battery pack and the 12V lead storage battery pack at the same SOC is less than and equal to 4.4V.

7. The power source for vehicles according to claim 1, wherein the average voltage of the secondary battery pack is higher than or equal to 13V.

8. The power source for vehicles according to claim 1, wherein the power source for vehicles comprises an idle stop and go (ISG) cancellation unit to cancel an ISG mode of the vehicle when the voltage of the secondary battery pack drops down to a reference voltage value.

9. A vehicle comprising:
 a secondary battery pack to support power required to start up a vehicle and power required for an electronic device equipped in the vehicle together, and having an operating voltage range of 9V to 19V in which a maximum operating voltage ranges from 16V to 19V and an average voltage is higher than or equal to 12V; and
 an alternator to produce a charging power for the secondary battery pack in response to operation of an engine of the vehicle.

10. The vehicle according to claim 9, wherein the average voltage of the battery pack has a higher value than a nominal voltage of the electronic device equipped in the vehicle.

11. The vehicle according to claim 9, wherein the alternator applies a charging voltage between both ends of the secondary battery pack, and a higher voltage than the voltage of the secondary battery pack is applied.

12. The vehicle according to claim 9, wherein the alternator produces a charging current in a range of 0 A to 300 A and provides it to the secondary battery pack.

13. The vehicle according to claim 9, wherein an output voltage of the secondary battery pack at a certain state of charge (SOC) is higher than an output voltage of a 12V lead storage battery pack at the same SOC.

14. The vehicle according to claim 13, wherein an output voltage difference between the secondary battery pack and the 12V lead storage battery pack at the same SOC is less than and equal to 4.4V.

15. The vehicle according to claim 9, wherein the average voltage of the secondary battery pack is higher than or equal to 13V.

16. The vehicle according to claim 9, wherein the vehicle comprises an idle stop and go (ISG) cancellation unit to cancel an ISG mode of the vehicle when the voltage of the secondary battery pack drops down to a reference voltage value.

* * * * *